Figure 1:
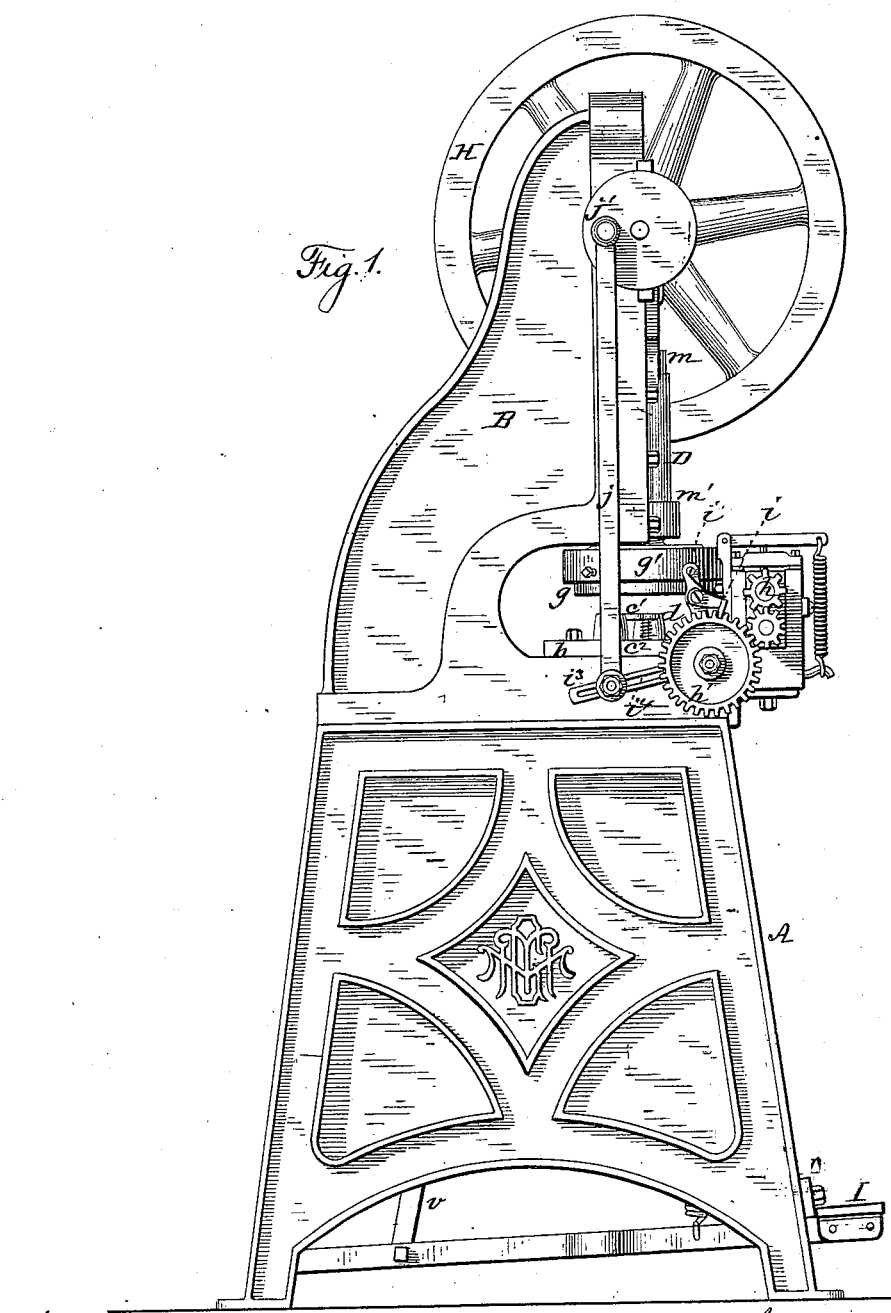

(No Model.) 5 Sheets—Sheet 1.

J. MUNDELL & W. J. GORDON.
MACHINE FOR CUTTING HEEL LIFTS.

No. 267,573. Patented Nov. 14, 1882.

Witnesses:
Edmond Brodhag
Howell Bartle

Inventors:
James Mundell
William J. Gordon
pp. Johnson and Johnson
Attys.

N. PETERS. Photo-Lithographer, Washington, D. C.

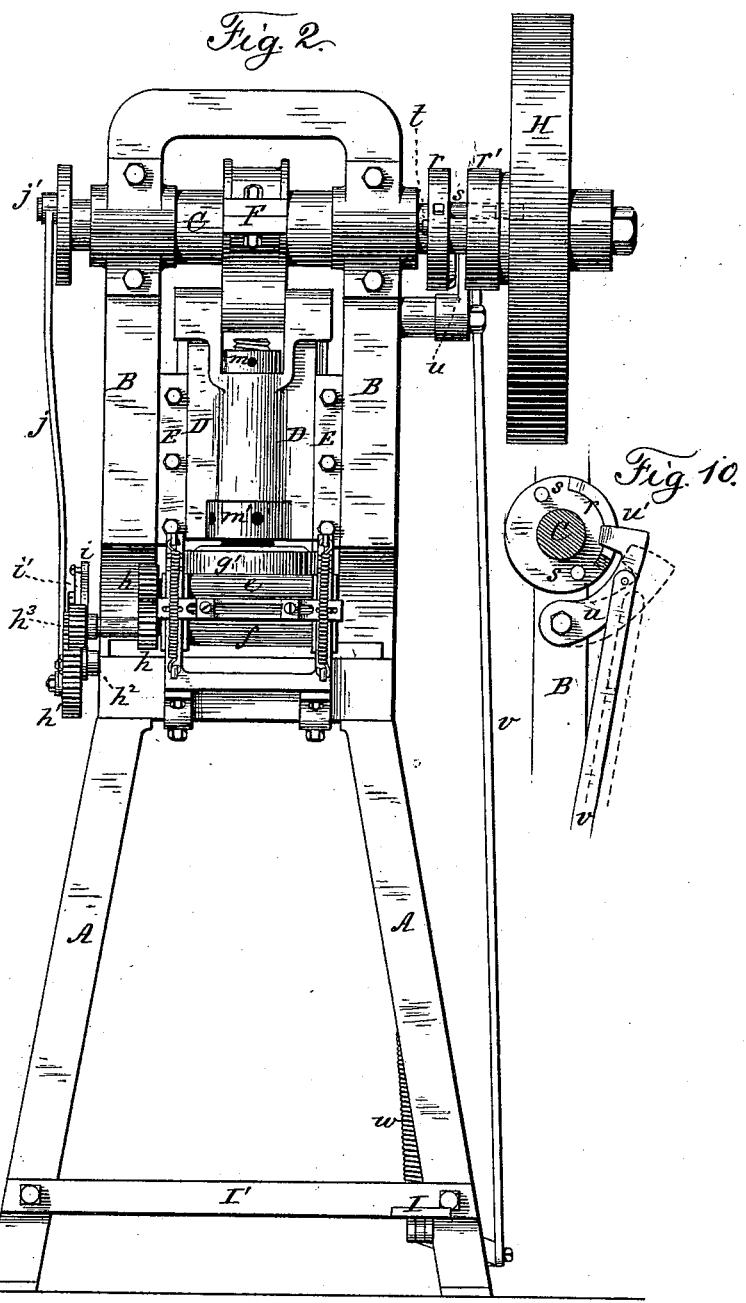

(No Model.) 5 Sheets—Sheet 3.
J. MUNDELL & W. J. GORDON.
MACHINE FOR CUTTING HEEL LIFTS.
No. 267,573. Patented Nov. 14, 1882.
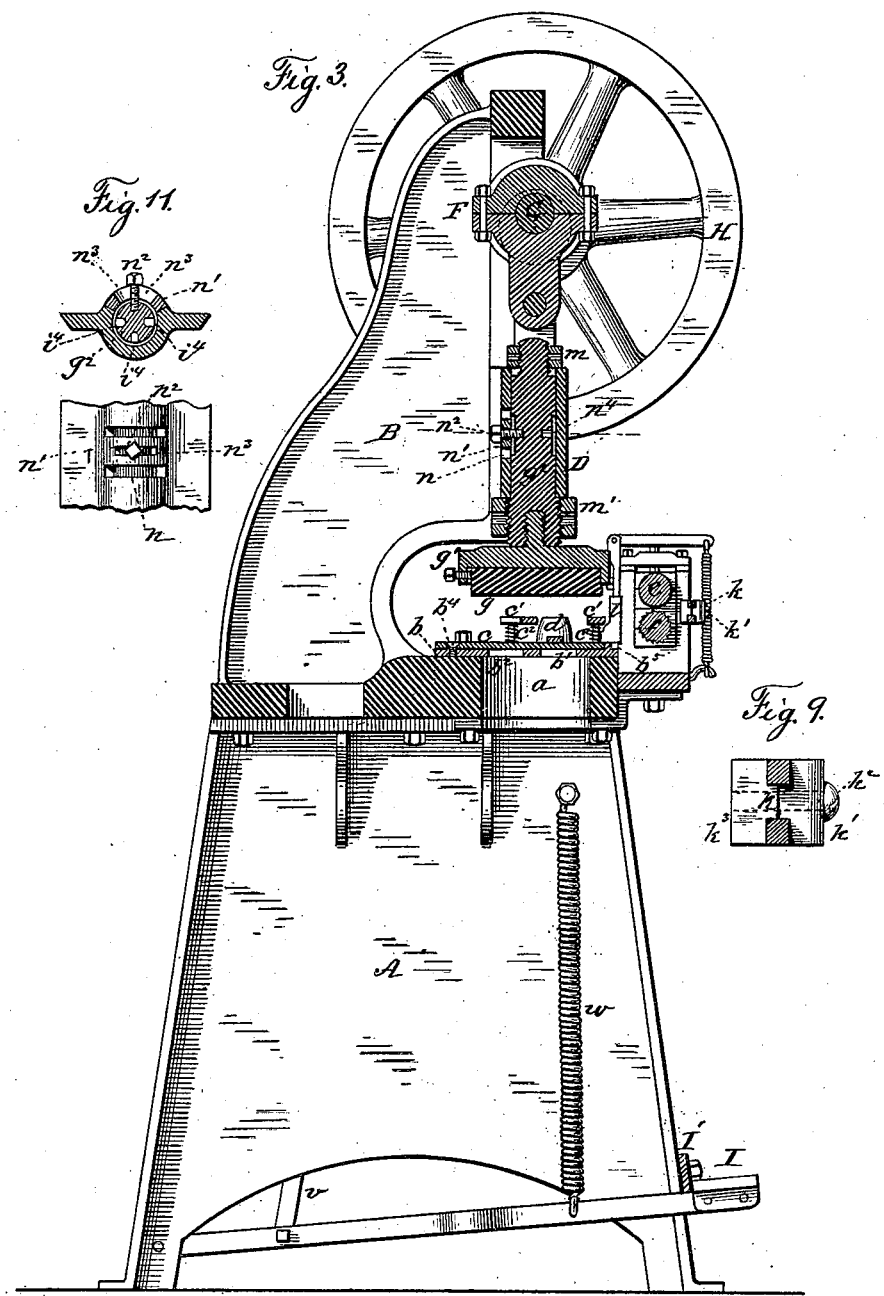

(No Model.)
J. MUNDELL & W. J. GORDON.
MACHINE FOR CUTTING HEEL LIFTS.
No. 267,573. Patented Nov. 14, 1882.
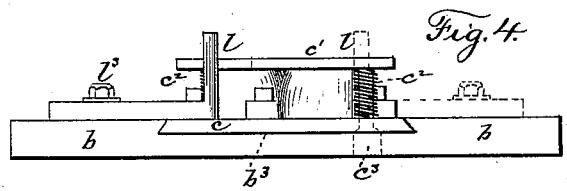
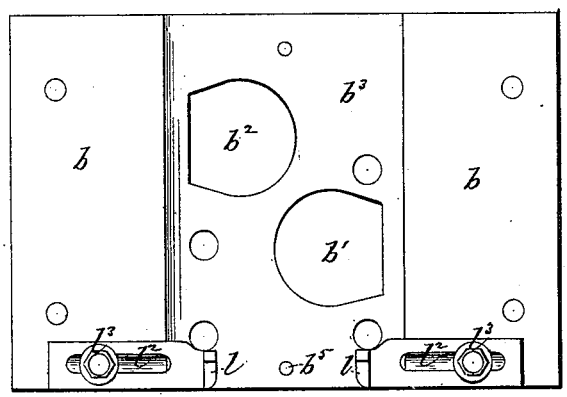
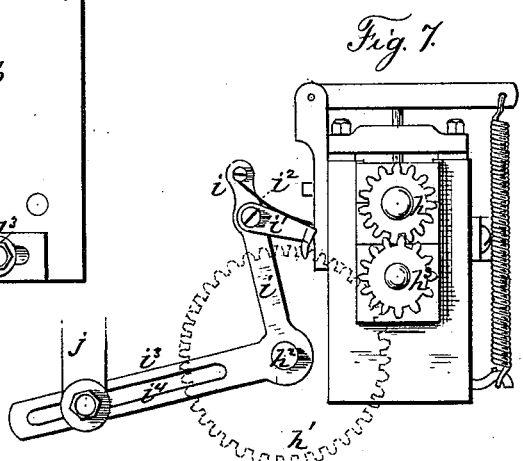
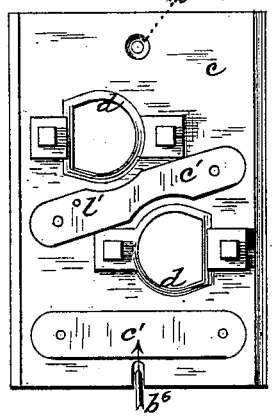
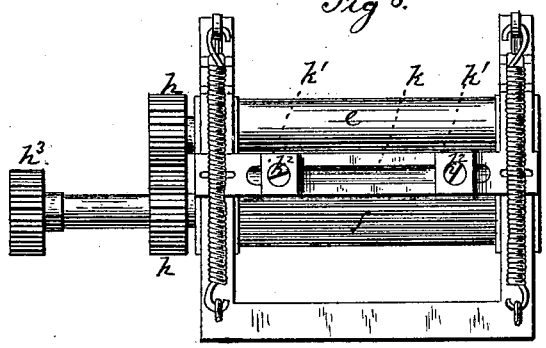
Witnesses:
Edmond Brodhag
Howell Battle
Inventors:
James Mundell
William J. Gordon
pp. Johnson & Johnson
Attys.

(No Model.)  5 Sheets—Sheet 5.

J. MUNDELL & W. J. GORDON.
MACHINE FOR CUTTING HEEL LIFTS.

No. 267,573.  Patented Nov. 14, 1882.

Witnesses:
Edmond Brohag.
Howell Bartte.

Inventors:
James Mundell
William J. Gordon
pp. Johnson & Johnson
Attys

UNITED STATES PATENT OFFICE.

JAMES MUNDELL AND WILLIAM J. GORDON, OF PHILADELPHIA, PA., ASSIGNORS OF ONE-THIRD TO JOHN MUNDELL, OF SAME PLACE.

MACHINE FOR CUTTING HEEL-LIFTS.

SPECIFICATION forming part of Letters Patent No. 267,573, dated November 14, 1882.

Application filed August 7, 1882. (No model.)

*To all whom it may concern:*

Be it known that we, JAMES MUNDELL and WILLIAM J. GORDON, citizens of the United States, residing at the city and county of Philadelphia, and State of Pennsylvania, have invented new and useful Improvements in Machines for Cutting Out Heel-Lifts, of which the following is a specification.

Our invention relates to improvements in the class of machines for cutting out heel-lifts for boots and shoes by separate cutting-dies arranged so that the rounded ends of the lifts cut from one portion of a strip of leather by one cutting-die will fall in the space between the rounded cuts made in the other portion of the leather strip by the other cutting-die, producing two lifts at one operation.

An important matter of our invention is the combination, with cutting-dies positioned to produce two lifts, of rolls adapted to effect a positively-intermittent feed of the strip of leather to the cutting-dies and feed mechanism operated by the stamping-press, so as to position the strip of leather in exact relation to the cuts left by the cut-out lifts, thus providing a feed for the strip of sole leather whereby its uncut parts will meet exactly with the cut lines of the cut-out lifts in such relation to the cutting-dies as to produce the two lifts under a mechanical feed with the least waste of stock. Mechanism for cutting out heel-lifts with such a feed we have applied to and used with a stamping-press with comparatively little cost as an organized machine, requiring no special skill to attend it, and producing in a given time a much greater number of lifts than could be produced by hand-feed, thus lessening the cost of production.

Other matters of invention, both of construction and of combinations, embraced in our machine are illustrated in the accompanying drawings, and will be hereinafter described preparatory to a specific designation of the matter claimed as our invention.

Figure 12:
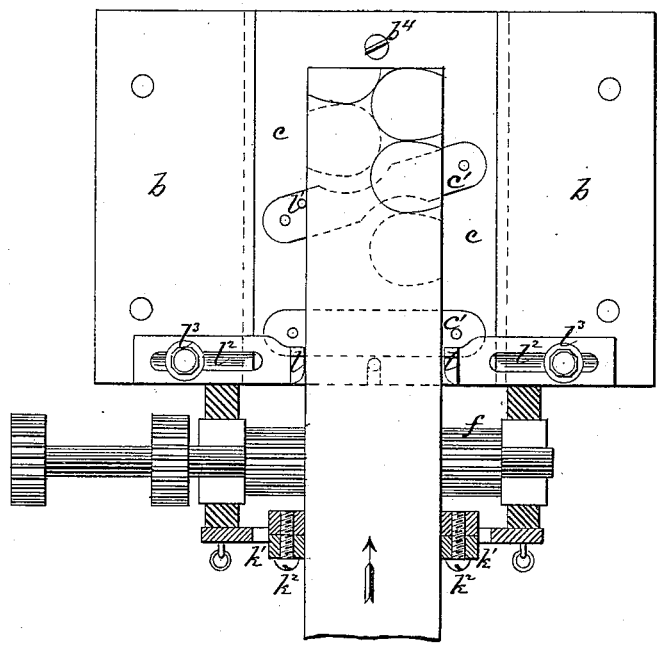
Figure 13:
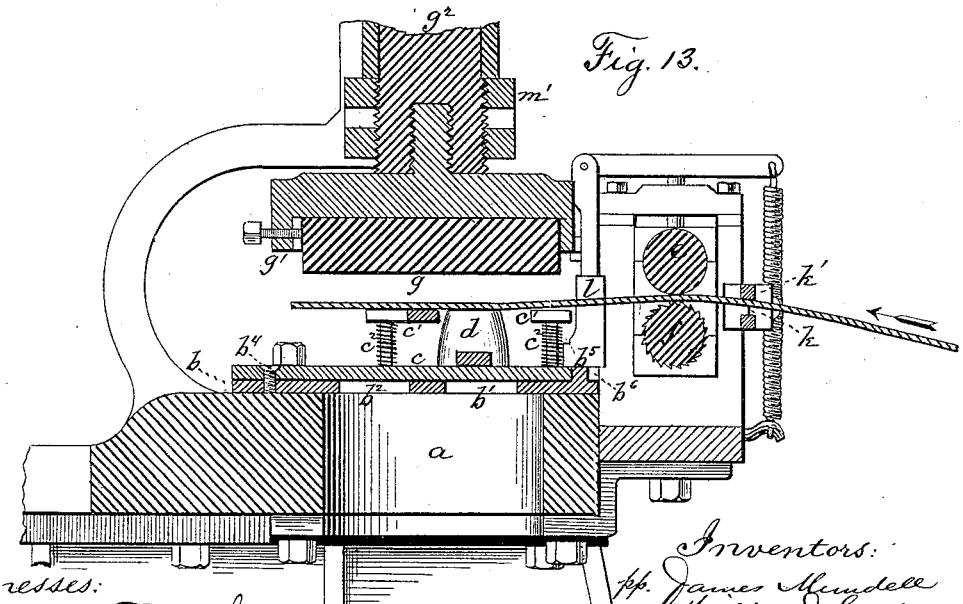

Referring to these drawings, Figure 1 represents an elevation of the machine for cutting out heel-lifts by a mechanical register-feed, showing the feed connection with the operating-shaft of a stamping-press; Fig. 2, a front elevation of the machine; Fig. 3, a vertical section of the machine, showing the relation of the intermittent feed-rolls to the cutting-dies and the stamping or pressing block. Fig. 4 shows an end view of the bed-plate which carries the cutting-die and the gages; Fig. 5, a top view of the bed-plate, with its gages, the cutting-die being removed; Fig. 6, a top view of the cutting-die plate, with the cutting-dies and the stripper-plates. Fig. 7 shows the intermittent-feed mechanism for the feed-rolls; Fig. 8, a front elevation of the feed-rolls, showing the front guide and its laterally-adjustable gages; Fig. 9, Sheet 3, a detail of the front guide and one of its laterally-adjustable gages; Fig. 10, Sheet 2, a detail of the clutch device for starting and stopping the machine; Fig. 11, Sheet 3, detail sectional views of the slide and carrier for the stamp-block, showing the means for adjusting the stamp-block on its axis to change the pressure-surface of the block in its relation to the cutting-dies. Fig. 12 represents a horizontal section taken above the surface of the leather, showing a portion of the strip from which lifts have been cut and the position of the cutting-dies in dotted lines to cut two other lifts from the strip, which is fed mechanically, so as to register the cut edges with the fixed cutting-dies; and Fig. 13 a vertical section, showing the leather strip as it is supported and fed to the cutting-dies.

The operating mechanism of the machine is organized upon a frame preferably such as that used in machines for cutting and stamping articles of sheet metal, in which the stamping or cutting die is carried by a vertically-reciprocating slide mounted in guides in a top frame and operated by a horizontal shaft having an eccentric connected with said slide by a pivot-joined box. In such frame, A is the base; B, the top frame; C, the operating-shaft; D, the vertically-reciprocating slide which carries the stamp-block, secured in guides E at the front of the top frame; F, the box pivoted to the upper end of the slide, and connecting it with the eccentric G of the shaft, which is operated by a band-pulley, H, loose thereon, and provided with a clutch device connecting with a treadle, I, whereby the machine is placed under the control of the attendant and operated with a regular and uniform speed. The base of the top frame has an opening or openings, $a$, and a bed-plate, $b$, is secured upon said base, to which a cutting-die plate, $c$, is secured, there being openings $b'$ $b^2$ in the bed-plate coincident with the hollow open cutting-dies $d$ $d$ and the opening $a$, to allow the heel-lifts to fall through as they are cut out by the dies. The cutting-die plate $c$ is set in a recess, $b^3$, in the upper surface of the bed-plate $b$, being fitted with beveled edges to slide therein, and by which, in connection with a screw, $b^4$, Fig. 3, it is removably secured to the bed-plate. When set in place a surface-pin, $b^5$, Figs. 3 and 5, at the front of the bed-plate, serves as a stop entering a notch, $b^6$, Fig. 6, in the front of the die-plate, so as to register the open cutting-dies with the openings $b'$ $b^2$ in the bed-plate. The dies $d$, having the top cutting-edge of the form of the heel-lifts, are hollow and open and secured to the surface of the plate $c$ in oblique relation to each other, with an intervening space, their rounded ends on a line nearly centrally lengthwise of the plate, and their straight edges next to and parallel with the beveled edges of the die-plate. The die-plate $c$ also carries two narrow plates, $c'$ $c'$, one of which is arranged in front of the dies and the other between them, mounted horizontally upon springs $c^2$ $c^2$, and supported in position by guide-pins passing through the springs, so that in their normal positions their upper sides will be slightly above the cutting-edges of the dies, in which positions they are maintained against the upward pressure of the springs by the guide-pins. These narrow plates $c'$ are arranged across the die-plate $c$, and they serve to support the leather strip free of the cutting-dies as it is fed over them, descending, under the pressing action of the stamp-block, with the leather and rising and stripping it from the dies after each cut and the release of the pressure-block. The guide-pins descend through openings $c^3$, Fig. 4, in the bed-plate, their lower ends being headed and fitting into countersinks in the under side of the die-plate to limit the ascent of the stripping-plates.

The adaptation of the die-plate for removal, by taking out the screw $b^4$ and drawing the plate out rearward, renders it very convenient to change the dies for others of different size and shape, as the die-plate is slid into its recessed seat from the rear side of the machine in the space between the standards B of the top frame without interfering with any other part of the machine.

Feed-rolls $e$ $f$ are arranged at the front of the top frame to feed the leather strip intermittently to the cutting-dies, while the latter and the spring-plates $c'$ $c'$ are arranged to receive the action of the stamp-block $g$, which is of circular form, of wood or other suitable material, removably secured in a recessed head, $g'$, screwed to a stem, $g^2$, fitted centrally within a sleeve in the press-slide. Provision is made for adjusting the pressure-block vertically in relation to the cutting-dies, and to compensate for the wearing of its surface, and for rotating the block by adjustments to present a new surface to the cutting-dies, which provisions will be hereinafter described. The feed-rolls are mounted in a suitable frame, which is secured to the front of the machine, the lower roll, $f$, being formed with parallel longitudinal ribs, and non-yielding, while the upper one is plain and is adapted to yield vertically to suit different thickness of leather. They are geared together by equal pinions $h$, so as to give a positive feed to the strip of leather, the upper roll operating to press the leather down upon the lower ribbed one. A feed mechanism connects the lower ribbed roll, $f$, with the operating-shaft C of the press, and operates to register the feed of the strip of leather to the cutting-dies. A spur-gear, $h'$, a little larger than twice the diameter of the pinion $h$, is mounted upon a stud, $h^2$, and engages with a pinion, $h^3$, on the end of the shaft of the lower feed-roll. A bell-crank lever mounted upon the stud $h^2$ carries on one arm, $i$, a ratchet-pawl, $i'$, adapted to take into the teeth of the gear $h'$, being held in position by a spring, $i^2$, attached to the pawl-carrying arm. The other arm, $i^3$, of said bell-crank lever is connected with a rod, $j$, the upper end of which is connected with a crank-pin, $j'$, on one end of the press-operating shaft, whereby the feed-rolls are operated to feed the leather strip forward to the cutting-dies with an intermittent registered feed, so that as one set of lifts are cut the strip will be fed to bring the cut edges of the strip in such relation to the edges of the dies as to cut the next lifts without waste. This feed is effected simultaneously with the ascent of the stamp-block from the shaft which operates it, and it may be adjusted to feed the leather a greater or less distance to suit different sizes of dies and to give an exact feed of the leather to the dies by adjusting the connecting-rod $j$ farther from or nearer to the pivot-stud $h^2$, such adjustment being effected by means of a slot, $i^4$, or holes in the arm $i^3$ of the bell-crank lever. The adjustment of the crank-pin connecting-rod $j$ nearer to the lever-pivot $h^2$ will cause the pawl $i'$ to move through a less arc, and hence to give a less feed to the rolls than when the crank-pin is adjusted farther from the lever-pivot. For convenience in regulating such adjustment according to the sizes of the heel-lifts to be produced a scale may be provided on the arm $i^3$ of the lever, and the sizes of the cutting-dies may be indicated accordingly. Each ascending movement of the stamp-block operates the bell-crank lever, which, by its pawl $i'$, turns the spur-gear $h'$ and operates the feed-rolls, the pawl slipping over the gear-teeth upon the descending movement of the stamp-block.

A guide-slot, $k$, for the leather strip, is provided in front of the feed-rolls, and gages $k'$, adapted for lateral adjustment within said slot, serve to prevent sidewise movement of the leather strip as it is fed between the rolls. These gages are clamped to the slotted guide-plate by screws $k^2$, passing through the slot into nuts $k^3$ on the inner sides of the guide-plate. Co-operating with these front gages are gages $l$, Figs. 4 and 5, attached to the front of the bed-plate $b$, and made laterally adjustable by slots $l^2$ and screws $l^3$, to suit different widths of leather strips, and hold the strip in proper relation to the cutting-dies as it is fed from the rolls. The strip-supporting and stripping plate $c'$, arranged between the dies, is provided with a pin, $l'$, in line with the left-hand gage $l$, to direct the leather strip properly over the rear cutting-die. The adjustment of the stamping-block $g$, for the purpose stated, is effected in the following manner, viz: The slide D of the press forms a sleeve for the stem $g^2$, which carries the stamp-block $g$, the ends of said stem being provided with screw-threads to receive nuts $m\ m'$, which, being screwed against the upper and lower edges of the slide, secure the stem thereto. By unscrewing the lower nut, $m'$, and screwing up the upper nut, $m$, the stamp-block will be correspondingly raised, and by reversing the screwing of these nuts it will be accordingly lowered, and in this way the block is set to give the proper pressure upon the leather to make the cuts complete and to compensate for the wear of the surface of the block under the action of the dies. The rotary adjustment of the block is effected in the following manner, viz: A segmental opening, $n$, in the sleeve of the slide is adapted to receive a segmental plate, $n'$, so that it may be clamped by a screw, $n^2$, upon the stem $g^2$ and allow it to be moved with the stem in its vertical adjustment, as shown in Fig. 3. This segmental plate $n'$ has a horizontal slot, $n^3$, through which the clamping-screw $n^2$ passes, and as this plate is prevented, by fitting against the vertical ends of the sleeve-opening $n$, from moving horizontally, the stem can be turned upon its axis by unclamping the screw $n^2$, and thus present a new surface of the pressing-block to the action of the cutting-dies. In this way the pressing-block can be turned entirely around, a little at a time, its carrying-stem being provided with taps $i^4$, as shown in Fig. 11, into which the clamping-screw is inserted when brought opposite the slot $n^3$ in the segmental plate $n'$, it being understood that the stem is clamped to the segmental plate at every adjustment, and that such adjustment is only sufficient to turn the block enough to bring an uncut part of its surface over the edges of the dies, and thus allow the block to be used much longer. It may also be reversed in its holder when one side is entirely filled with cuts.

The gages having been set to suit the width of the sole-leather strip, it is fed into the front guide-slot, $k$, between the rolls, which carry it forward by an intermittent feed adjusted to carry it a distance exactly equal to the distance between the cutting-dies in a forward line, so that the first heel-lift will be cut by the front die from the right-hand corner of the strip, the succeeding cuts being by both dies from both edges of the strip under the automatic feed, so that the rounded part of a lift cut from one edge will join the rounded parts of two lifts cut from the other edge of the strip, as shown in Fig. 12.

The front guide-plate may be provided with a scale by which to set the gages $k'$ to suit sole-strips of different widths for different-size dies.

The clutch device for stopping and starting the machine may be of any suitable construction. That shown consists of a collar, $r$, adapted to slide but not to turn upon the shaft C, provided with pins $s$, projecting horizontally from its face into slots in a collar, $r'$, fixed upon said shaft. A spring-pin, $t$, fitted in the standard B, bears against the sliding collar, and constantly tends to press its pins into holes in the hub of the loose pulley. A wedge-arm, $u$, pivoted to the standard B, is connected by a rod, $v$, with the treadle I, which is constantly pulled up against a stop, I', by a spring, $w$, connected with the base-frame.

When the machine is not working the wedge end $u'$ of the pivoted arm $u$ is forced by the treadle-rod between the fixed and sliding collars $r'\ r$, pressing the latter away from the fixed collar, as in Fig. 2, the pins $s\ s$ being thus withdrawn from the holes in the hub of the loose pulley H, so that the latter will revolve upon the shaft.

To start the machine the attendant depresses the treadle, which withdraws the wedge-arm $u'$ from between the collars $r\ r'$, when the pins of the sliding collar will be forced into the holes in the loose pulley, so as to lock it with the fixed collar to operate the press.

It is obvious that by using suitable cutting-dies the machine may be adapted for cutting out shoe-soles.

The reciprocating pressing-block having capacity for vertical adjustment, the cutting-die and spring-sustained table adapted to produce two heel-lifts from a strip of leather at one operation, the feed-rolls, and the treadle-clutch device for starting and stopping the machine are matters not claimed herein, as they are broadly and separately old in the arts; but the organization of these factors with other co-operating devices in a heel-machine, as herein set forth, constitutes our improvements.

We claim—

1. In a machine for cutting out heel-lifts, the combination of the stationary hollow cutting-dies $d\ d$, the spring-sustained plates $c'\ c'$, and the reciprocating stamping or pressing block $g$ with the feed-rolls $e\ f$, operated by an intermittent register-feed, substantially as described, for the purpose specified.

2. The combination of the stationary hollow cutting-dies, the spring-sustained plates $c'\ c'$, and the reciprocating stamping or pressing block with feed-rolls and mechanism connecting them with the block-operating shaft, whereby to feed the sole-leather strip to the cutting-dies with an intermittent register-feed, substantially as described, for the purpose specified.

3. The combination of the feed-rolls and the reciprocating stamping or pressing block with mechanism for operating said feed-rolls, consisting of the pinions $h\ h\ h^3$, the spur-gear $h'$, the bell-crank lever, the pawl, and the rod $j$, connecting said bell-crank lever with a crank-pin, $j'$, on the block-operating shaft, the stationary hollow cutting-dies, and the spring-sustained plates $c'\ c'$ constructed and arranged for cutting out heel-lifts by a mechanical register-feed suited to the size of the dies.

4. The combination of the bed-plate $b$, having the gages $l\ l$, and the removable plate $c$, having the stationary hollow cutting-dies, and the spring-sustained plates $c'\ c'$ with the rolls having an intermittent register-feed, the front guide, $k$, having the gages $k'$, the pressing-block, and mechanism for operating said feed-rolls during the ascending movement of the reciprocating pressing-block, substantially as described, for the purpose specified.

5. The combination, in a machine for cutting out heel-lifts, of the fixed hollow cutting-dies $d\ d$ and the spring-sustained plates $c'\ c'$ with a reciprocating pressing-block adapted for vertical and rotary adjustment in relation to said dies, substantially as described, for the purpose specified.

6. In combination, in a machine for cutting out heel-lifts, the fixed hollow cutting-dies, the spring-sustained plates $c'\ c'$, the vertical stem $g^2$, carrying the reciprocating pressing-block, the vertically-adjusting nuts $m\ m'$ therefor, the block-operating slide D, having the opening $n$, the segmental slotted plate $n'$, arranged within said opening $n$, and the screw $n^2$, for clamping the segmental plate to the vertically-adjustable stem, whereby the pressing-block is adapted for adjustment, both vertically and upon its axis, in relation to the cutting-dies, for the purpose specified.

7. In an organized machine for cutting out two heel-lifts simultaneously from a strip of leather fed by an intermittent mechanical register-feed, the following instrumentalities, viz: the stationary hollow cutting-dies and the spring-sustained plates carried by a removable die-plate, the pressing-block adapted for adjustment vertically and upon its axis, the feed-rolls, mechanism whereby they are connected with and operated by the pressing-block-operating shaft with a register-feed, and gages arranged in front of said intermittently-feeding rolls and in front of said cutting-dies, substantially as described.

In testimony whereof we have hereunto set our hands in the presence of two subscribing witnesses.

JAMES MUNDELL.
WILLIAM J. GORDON.

Witnesses:
THEO. D. RAND,
H. M. TUPUD.